United States Patent
Sakamoto et al.

(10) Patent No.: US 6,447,957 B1
(45) Date of Patent: Sep. 10, 2002

(54) METAL FOIL FOR COLLECTOR AND METHOD OF MANUFACTURING THE SAME, COLLECTOR FOR SECONDARY BATTERY AND SECONDARY BATTERY

(75) Inventors: Hiroyuki Sakamoto; Hiroshi Tada; Toshihisa Tamai, all of Osaka (JP)

(73) Assignee: Toyo Aluminum Kabushiki Kaisha, Osaka (JP)

( * ) Notice: Subject to any disclaimer, the term of this patent is extended or adjusted under 35 U.S.C. 154(b) by 0 days.

(21) Appl. No.: 09/543,279

(22) Filed: Apr. 5, 2000

(30) Foreign Application Priority Data

Apr. 5, 1999 (JP) .............................. 11-097832

(51) Int. Cl.⁷ ................................. H01M 4/74
(52) U.S. Cl. ...................... 429/242; 429/233; 429/236; 429/241
(58) Field of Search ................................ 429/233, 236, 429/241, 242

(56) References Cited

U.S. PATENT DOCUMENTS 6,110,622 A * 8/2000 Frysz et al. .............. 429/231.9

6,210,827 B1 * 4/2001 Dopp et al. ................. 429/122

FOREIGN PATENT DOCUMENTS

JP          63121263          5/1988

* cited by examiner

Primary Examiner—Carol Chaney
Assistant Examiner—Dah-Wei Yuan
(74) Attorney, Agent, or Firm—W. F. Fasse; W. G. Fasse (57) ABSTRACT

A collector for a secondary battery includes a metal foil having throughholes shaped or arranged to achieve an increased hole area ratio to improve an active material's adhesion thereto. A throughhole in the metal foil has a largest dimension of at least 1.55 mm, and the foil has a hole area ratio of at least 40%, and a thickness of at least 5 μm and at most 200 μm. The throughhole has a peripheral shape including two substantially straight sides that extend along lines intersecting with each other on their respective extensions to form an acute angle at a corner of the throughhole. To form the metal foil, a resist film with a predetermined pattern is arranged on a solid foil, and is used as a mask to etch the foil to provide the plurality of throughholes penetrating the foil.

28 Claims, 5 Drawing Sheets

METAL FOIL FOR COLLECTOR AND METHOD OF MANUFACTURING THE SAME, COLLECTOR FOR SECONDARY BATTERY AND SECONDARY BATTERY

BACKGROUND OF THE INVENTION

1. Field of the Invention

The present invention relates generally to collectors for secondary batteries and the secondary batteries, and particularly to metal foil as a material of collectors for lithium ion batteries and polymer lithium ion batteries and methods of manufacturing the same.

2. Description of the Background Art

In recent years, lithium ion batteries and polymer lithium ion batteries have been used as a secondary battery of high energy efficiency to supply power to various types of electronics.

A conventionally used collector for a secondary battery is formed of a metal foil having round or square throughholes, with a pasted active material for example of an interlayer graphite compound, a conductive polymer compound, activated carbon, a carbide of phenol-based fiber, and a lithium-based compound applied and processed and thus adhering the pasted active material to a surface of the metal foil. The metal foil has a throughhole diameter or size of approximately 0.5 to 1 mm and a hole area ratio of approximately 20 to 40%. A punching metal pattern is used in providing the throughholes in the metal foil.

Conventional metal foil for a collector is provided with multiple throughholes to increase the foil's surface area to improve an active material's adhesion thereto. Forming such throughholes having as large a diameter as possible at as high a density as possible can increase the foil's surface area and thus enhance the active material's adhesion to the foil.

However, if conventional round or square throughholes provided in a metal foil have a diameter of 1.55 mm or more and a hole area ratio of 40% or more, an active material can peel off or drop from the foil at a center of such round or square throughholes, resulting in a disadvantageously degraded adhesion of the active material to the foil. As such, any throughhole with a conventional shape is limited in diameter or size and hole area ratio.

Furthermore, providing a metal foil with conventional, round or square througholes and thus achieving an increased hole area ratio disadvantageously reduces the foil's strength. In particular, a metal foil for a collector can disadvantageously be torn apart or deform when it is prepared or an active material is applied thereto.

In conventionally preparing a metal foil for a collector, a punching metal pattern is used to provide throughholes therein. When such throughholes are punched in the metal foil for a collector, formed of a so-called punching metal, the metal foil's dust is disadvantageously introduced into the product or the foil is burred, resulting in an electrical short circuit internal to a secondary battery as a final product. This degrades the quality of the secondary battery as the final product. Furthermore, providing a metal foil with multiple fine throughholes requires a punching metal pattern with high precision dimensions. This requires a cumbersome maintenance of the metal pattern and other tools and equipment and thus disadvantageously increases the cost for preparing the metal foil and decreases the productivity thereof.

SUMMARY OF THE INVENTION

An object of the present invention is to provide a metal foil for a collector having a plurality of throughholes having a largest diameter of at least 1.55 mm and a shape allowing a hole area ratio increased to at least 40% to enhance an active material's adhesion thereto.

Another object of the present invention is to provide a metal foil for a collector having multiple throughholes having a largest diameter of at least 1.55 mm and achieving a hole area ratio of at least 40% to enhance an active material's adhesion thereto, wherein the throughholes are arranged to allow the foil to have a predetermined strength in a certain direction.

Still another object of the present invention is to provide a method of preparing a metal foil for a collector, capable of readily providing a throughhole allowing enhanced adhesion and improved quality and increased hole area ratio.

Further, another object of the present invention is to provide a collector with a metal foil capable of enhancing an active material's adhesion thereto.

Yet another object of the present invention is to provide a secondary battery with a collector capable of enhancing an active material's adhesion thereto.

In accordance with the present invention a metal foil for a collector has a plurality of throughholes having a largest diameter or dimension of at least 1.55 mm, a hole area ratio of at least 40% and a thickness of at least 5 $\mu$m and at most 200 $\mu$m, wherein the throughhole has a peripheral shape including two substantially straight sides extending along lines intersecting each other at an acute angle to form a corner of the throughhole.

The throughhole's peripheral shape as described above allows the throughhole to be formed with a large diameter or dimension to provide an increased hole area ratio and also achieves an enhanced adhesion of the active material to the foil. In particular, providing the throughhole's acute corner as described above is more effective than providing a conventional round or square throughhole in preventing the possibility of the active material peeling off or dropping from the foil, to allow the active material to have a better adhesion to the foil.

Preferably the throughhole's peripheral shape as described above has a plurality of corners.

Furthermore, in accordance with the present invention a metal foil for a collector has a plurality of throughholes having a largest diameter of at least 1.55 mm, a hole area ratio of at least 40% and a thickness of at least 5 $\mu$m and at most 200 $\mu$m, wherein a continuous, elongate portion having a width of at least 0.1 mm and at most 2 mm extends in a certain direction between the plurality of throughholes.

The continuous, elongate portion as described above ensures that a metal foil for a collector can have a strength of at least a predetermined value if a large number of throughholes having a large diameter are formed to provide an increased hole area ratio. In rolling a metal foil to prepare it in the form of a strip and thereafter providing it with throughholes, the foil is required to have a predetermined tensile strength in a direction in which it is rolled. In accordance with the present invention, a predetermined, continuous, elongate portion extending in a certain direction can prevent a metal foil from being torn apart or deforming when the foil is initially rolled and then provided with a large number of throughholes satisfying the hole diameter and hole area ratio as above.

Preferably, the metal foil has in the certain direction a tensile strength of at least 6N when it has a width of 15 mm (6N/15 mm width).

Preferably, the metal foil is etched to provide the throughholes.

In accordance with the present invention, preferably a metal foil for a collector contains at least one of aluminum and copper.

In accordance with the present invention, still further preferably a metal foil for a collector has a plurality of throughholes having a largest diameter or dimension of at least 1.55 mm, a hole area ratio of at least 40% and a thickness of at least 5 μm and at most 200 μm, wherein the throughhole has a peripheral shape including two substantially straight sides extending along lines intersecting each other at an acute angle to form a corner of the throughhole, and a continuous, elongate portion having a width of at least 0.1 mm and at most 2 mm extends in a certain or selected direction between the plural throughholes.

Furthermore, in accordance with the present invention a collector for a secondary battery includes a metal foil characterized as described above.

Furthermore, in accordance with the present invention a secondary battery includes the collector as described above and preferably includes a positive electrode including a metal foil containing aluminum and characterized as described above, and a negative electrode including a metal foil containing copper and characterized as described above.

In accordance with the present invention a method of preparing a metal foil for a collector includes the steps of providing on a metal foil a resist film patterned as predetermined, etching the foil, with the resist film used as a mask, to provide a plurality of throughholes in the foil, and removing the resist film.

With the method as described above, when throughholes are formed any dust or burr does not result and a second battery as a final product is not adversely affected in quality. Furthermore, the method eliminates the necessity of cumbersome maintenance of a tool and equipment for providing a large number of throughholes and thus does not increase the cost for manufacturing the same or reduce the productivity thereof.

In the above method, preferably an acid or alkaline solution is used to etch the foil.

As described above, the present invention can provide a metal foil for a collector with a large hole area ratio and a high tensile strength in a certain direction. As such, there can be provided a metal foil for a collector or a collector which allows an active material to be reliably applied with good adhesion onto a surface of the foil and hardly disadvantageously creeps or deforms if the secondary battery is used for a long period of time.

Furthermore, in the present method of preparing a metal foil for a collector, a throughhole is provided by etching the foil, rather than mechanically processing the foil. The metal foil is thus free of a burr or dust resulting from punching a throughhole. This can prevent electrical short circuit and other deficiencies in using the secondary battery as a final product.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

In accordance with the present invention a metal foil for a collector has a thickness selected preferably in a range of 5 to 200 μm, still more preferably in a range of 20 to 100 μm. If the foil has a thickness less than 5 μm, it has an extremely reduced strength and is thus readily torn apart in the process for manufacturing the collector. The foil exceeding 200 μm in thickness is also not preferable, since it takes more time to etch the foil to provide throughholes, the secondary battery as a final product is increased in weight, and more of an active material must be applied than is needed.

In accordance with the present invention a metal foil for a collector is etched to have a large number of throughholes having a largest diameter of at least 1.55 mm. A "largest diameter (or size)" of a throughhole herein refers to a distance between two points on the throughhole's periphery that are most distant from each other as seen in a direction perpendicular to a direction in which the foil is rolled. If the throughholes have a largest diameter less than 1.55 mm, the foil cannot have an active material sufficiently adhering to a surface thereof and the active material may peel off or drop from the foil when it is being applied on the foil or the secondary battery is being used. A throughhole's largest diameter has an upper limit of approximately 5 mm and if it is exceeded the collector's tensile strength can be extremely reduced. As such a largest diameter in a range of 1.55 to 5.0 mm is preferable. In accordance with the present invention a metal foil for a collector may have throughholes of more than one type mixed in dimension or shape, rather than those of a single type. In such example, multiple throughholes having a largest-diameter average of at least 1.55 mm fall within the scope of the present invention, such as approximately 20 throughholes arbitrarily selected, their respective largest diameters measured and having an arithmetic average of at least 1.55 mm.

In accordance with the present invention, a metal foil may have any throughhole having a peripheral shape other than round and square shapes. The throughhole is only required to have a peripheral shape at least including two substantially straight sides intersecting with each other on their respective extensions to form an acute angle to form a corner of the throughhole. As such, in accordance with the present invention a throughhole may have a peripheral shape corresponding to a rhombus, parallelogram, polygon having more than four sides, sector, triangle, substantial semi-circle or substantial semi-ellipse, or a combination thereof as appropriately designed. Furthermore, the rhombus, parallelogram, polygon having more than four sides, triangle and the like may not be formed of precisely straight lines and may be formed of lines curving inwards or outwards. A throughhole actually formed in a metal foil depends on a property of the resist film used, an etching condition and the like and can thus have a corner rounded or a side, which should be straight, curving due to over-etch or under-etch. In such case, it may be necessary to design the throughhole (or pattern) to have a dimension with such conditions as above considered.

Normally a hole area ratio of at least 40%, preferably of at least 50%, is required. Ensuring the hole area ratio of at least 40% allows an active material to be efficiently applied onto a surface of a metal foil. Furthermore, the applied active material can firmly adhere to the front and back surfaces of the metal foil through throughholes and thus hardly peel off or drop from the foil.

While the throughholes are not particularly limited in arrangement, to ensure that a foil has a level of strength the foil preferably has a continuous, elongate portion in the form of a hole-free strip having a width of 0.1 to 2 mm and extending in a certain direction. Still further preferably, the certain direction matches the direction in which the foil is rolled when it is prepared. This ensures that the foil has a level of strength when the foil is wound or unwound and thus successively processed in providing a resist film and etching the foil to form throughholes. Furthermore, in applying an active material onto the foil, the foil is also required to have a level of strength in a direction perpendicular to the direction in which the foil is rolled. As such, the foil should have throughholes arranged to allow the foil to have a strength balanced in both of those directions. It should be noted that with the above mentioned, continuous, elongate portion having a width of less than 0.1 mm, it is difficult to ensure that a foil has a level of strength in a certain direction or a direction in which the foil is rolled, and that with the continuous, elongate portion having a width exceeding 2 mm, a predetermined hole area ratio can hardly be obtained and an active material on a foil's surface may have a reduced adhesion strength.

In accordance with the present invention a metal foil for a collector, for a width of 15 mm, preferably has a tensile strength of at least 6N in a certain direction or a direction in which the foil is rolled. It is undesirable for the foil to have a strength less than the above value in the certain direction or the direction in which the foil is rolled, since the foil with such strength is readily torn apart, deforms, wrinkles, or has an uneven surface when it is, for example, provided with a resist film, etched, or has an active material applied thereto.

In accordance with the present invention, a metal foil may be an aluminum foil, an aluminum alloy foil, a copper foil, a stainless steel foil, a nickel foil, and the like. It may also be a clad foil of a single type of metal or an alloy or the same type of metals or an alloy. A suitable metal foil for a collector allowing a positive-electrode active material for a secondary battery (for example lithium ion batteries and polymer lithium ion batteries) to adhere thereto is an aluminum foil or an aluminum alloy foil. The foil may be formed of aluminum or an aluminum alloy having a composition that may be appropriately selected, e.g., from pure aluminum (JIS Nominal No. 1000 system), an aluminum-manganese (Al—Mn)-based alloy (JIS Nominal No. 3000 system), an aluminum-magnesium (Al—Mg)-based alloy (JIS Nominal No. 5000 system) and an aluminum-iron (Al—Fe)-based alloy (JIS Nominal No. 8000 system), depending on the type of electrolyte used. A suitable metal foil for a collector allowing a negative-electrode active material for a secondary battery (for example lithium ion batteries and polymer lithium ion batteries) to adhere thereto is a copper foil.

In accordance with the present invention a method of preparing a metal foil for a collector does not have any particular limitation imposed thereon, as long as it uses a resist film as a mask to etch the foil to provide a plurality of throughholes in the foil, although it is preferable to adopt such a method as described below:

Initially, a resist film having a predetermined pattern is printed on a foil's surface. It should be noted that the resist film is provided on the foil's surface at a portion which is not etched. While the resist film may be printed using any printing technique, it is preferably printed using photogravure, transfer printing or the like. The printed resist film may be formed, for example, of acrylic, vinyl chloride-vinyl acetate copolymer and the like. In printing the resist film, thinner or any other appropriate solvent must be used to adjust the film's viscosity, as required. After the resist film is dried as appropriate, an appropriate acid or alkaline solution or the like is used to etch the foil. The etchant liquid can for example be a solution exclusively of sulfuric acid, phosphoric acid, chromic acid, nitric acid, hydrofluoric acid, acetic acid, caustic soda, ferric chloride, perchloric acid or the like, or a solution of a mixture thereof. Furthermore, such solution may be diluted appropriately with a solvent such as water and thus used as an etchant liquid. After the foil is etched and thus provided with throughholes as predetermined, the resist film is removed. The resist film can be removed for example with methylene chloride, an alkalescent solution or the like. After the resist film is removed, the foil is appropriately dried as required to complete a raw-material coil (a wound, coiled product) for a collector. The coil is cut to have an appropriate size as required, and thus supplied to the process step of applying an active material thereto. It should be noted that in accordance with the present invention a metal foil for a collector includes the above-described raw-material coil, metal foil supplied to the process step of applying an active material thereto, a collector, or a metal foil for the collector incorporated into a secondary battery.

Figure 6:
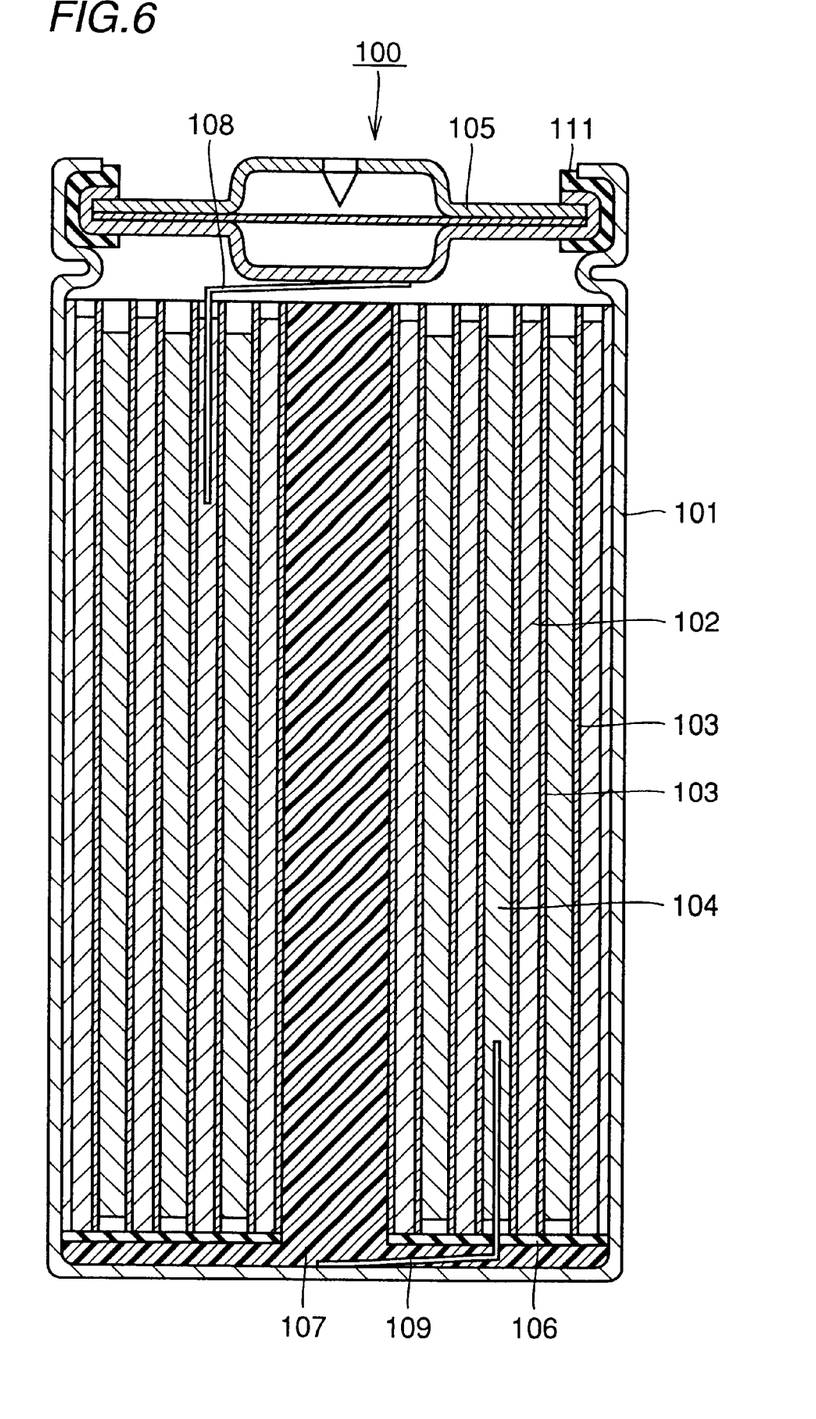
FIG. 6 is a cross section of a general configuration of a secondary battery according to one embodiment of the present invention.

As shown in FIG. 6, as a secondary battery according to one embodiment of the present invention a polymer lithium ion battery 100 includes a case 101, a positive electrode 102 helically arranged in case 101, a negative electrode 104 helically arranged opposite to positive electrode 102, an insulating separator 103 interposed between positive electrode 102 and negative electrode 104, an insulation plate 106 arranged at a lower portion of positive electrode 102, negative electrode 104 and separator 103, and an electrolyte 107 of polymer material filling a center of case 101. Positive electrode 102 is formed of a collector of a metal foil of aluminum characterized as above with a positive-electrode active material applied and processed and thus adhering thereto. Negative electrode 104 is formed of a collector of a metal foil of copper characterized as above with a negative-electrode active material applied and processed and thus adhering thereto. Positive electrode 102 is electrically connected to a positive electrode terminal 105 via a lead plate 108. Negative electrode 104 is electrically connected to case 101 serving as a negative electrode terminal via a lead plate 109. Between positive electrode terminal 105 and case 101 an insulating gasket 111 is interposed.

Figure 7:
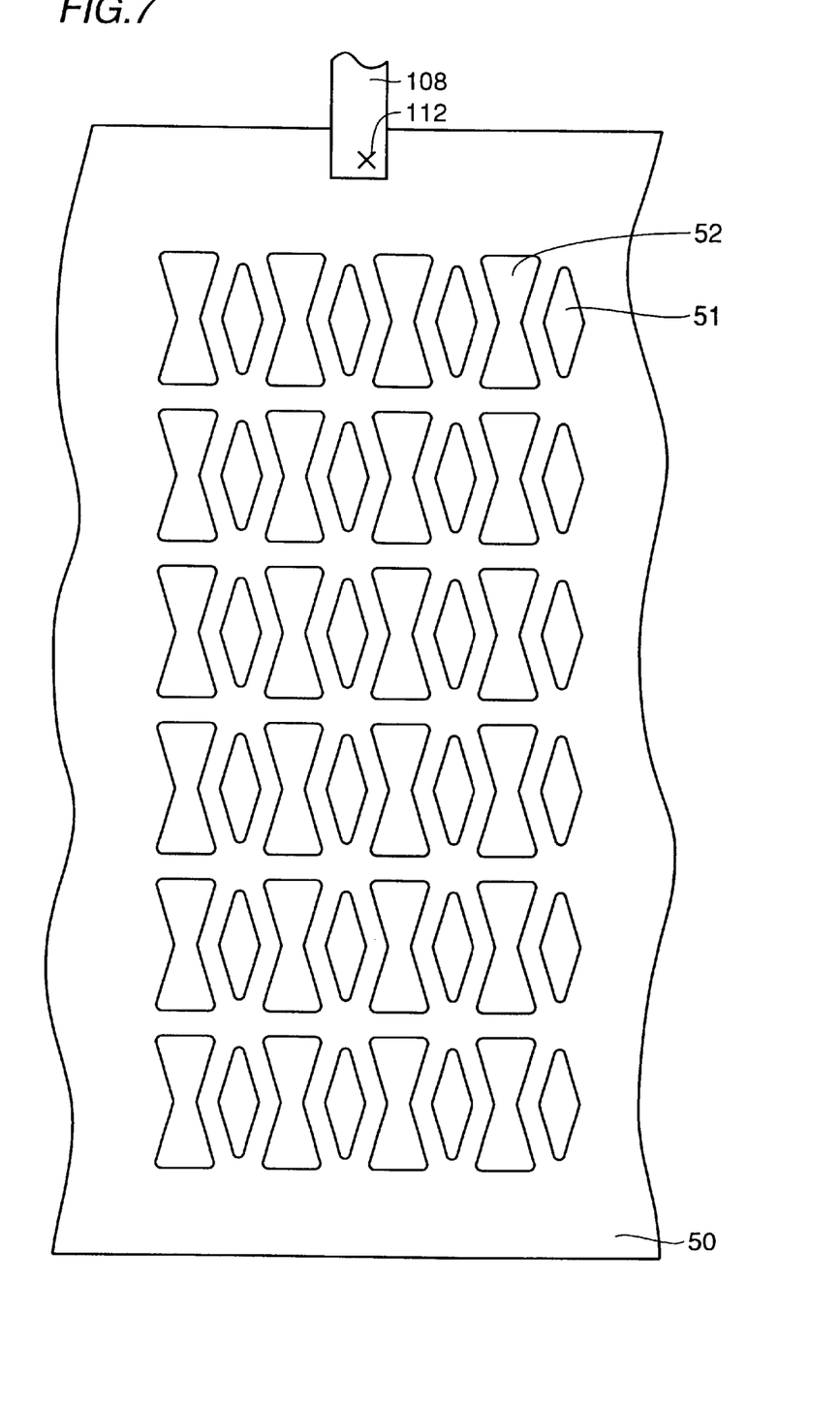
FIG. 7 is a plan view of a collector for a secondary battery according to one embodiment of the present invention.

As shown in FIG. 7, as a collector for a secondary battery according to one embodiment of the present invention, a positive-electrode collector 50 is formed of a metal foil of aluminum characterized as above, extends in the form of a strip (horizontally in the figure) and has two types of throughholes 51 and 52. Positive-electrode collector 50 has one end connected to lead plate 108 via a weld 112.

EXAMPLES

Figure 1:
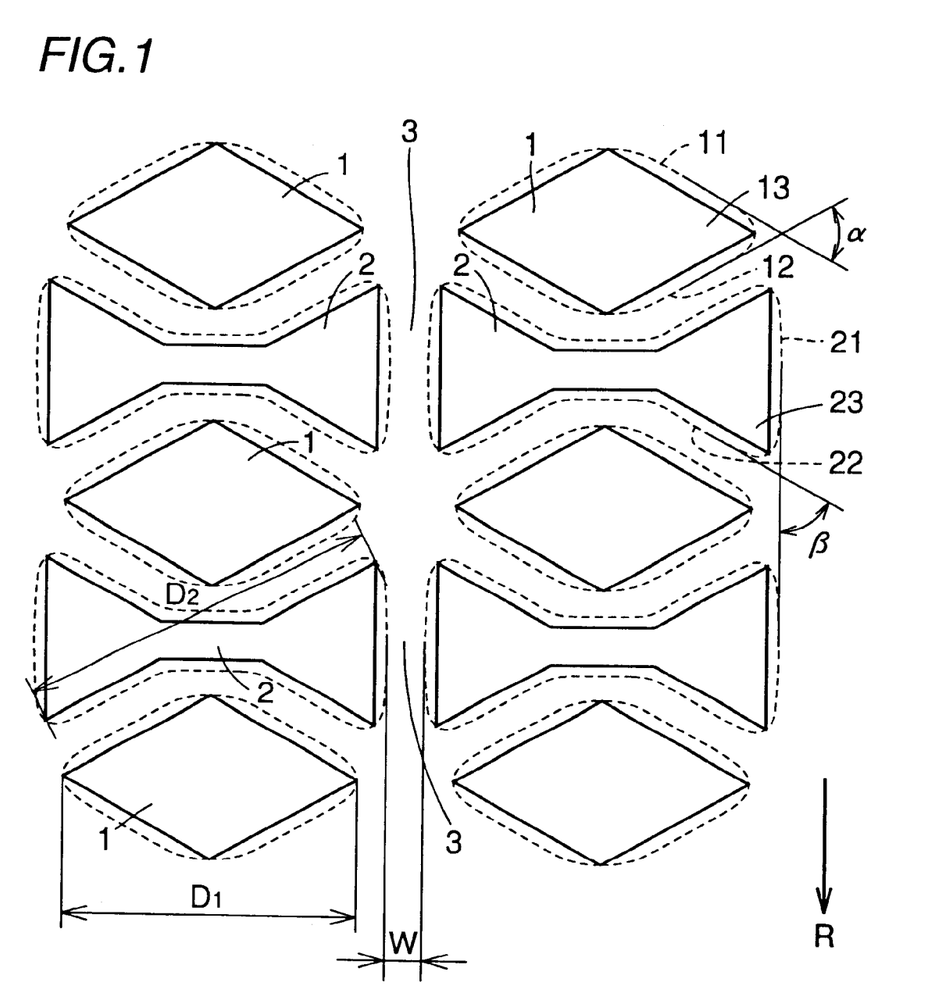
FIG. 1 shows a planar arrangement of throughholes provided in a sample A of a metal foil for a collector according to an embodiment of the present invention.
Figure 2:
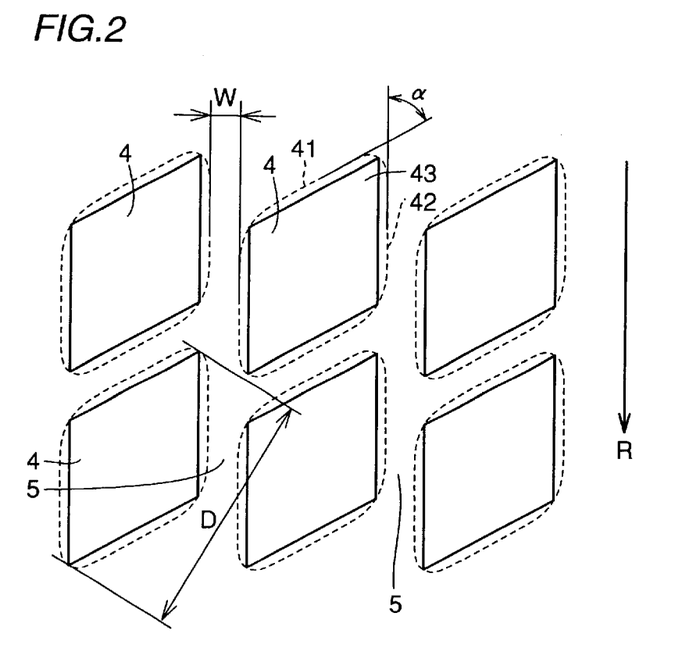
FIG. 2 shows a planar arrangement of throughholes provided in a sample B of a metal foil for a collector according to an embodiment of the present invention.
Figure 3:
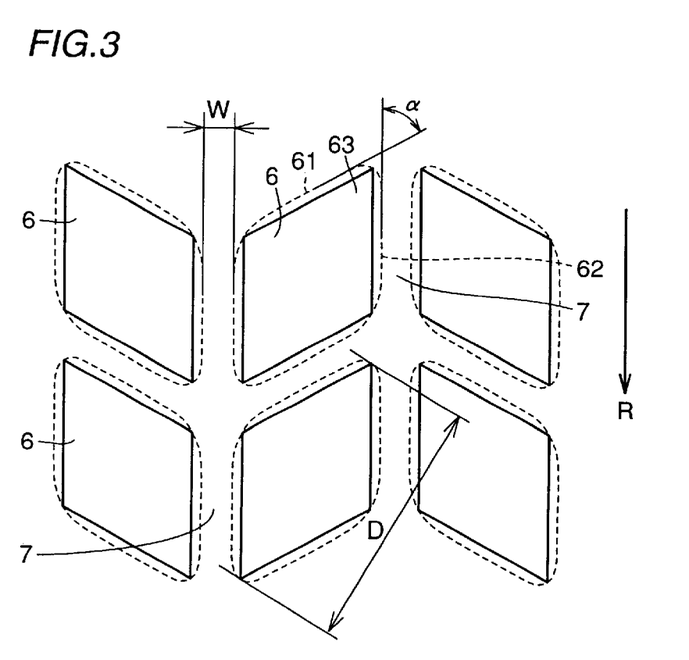
FIG. 3 shows a planar arrangement of throughholes provided in a sample C of a metal foil for a collector according to an embodiment of the present invention.

Samples A, B, C were prepared of a metal foil for a collector having the throughholes patterned as shown in FIGS. 1, 2, 3, respectively. It should be noted that in the figures a solid line corresponds to a shape of a resist film patterned as designed and a broken line corresponds to a shape actually obtained after the foil is etched. The samples were prepared as described below.

In order to provide throughholes patterned as shown in FIGS. 1–3, a gravure roll was used to provide a resist film of a predetermined pattern on opposite sides of a JIS 1N30 hard aluminum foil of 40 $\mu$m in thickness. The resist ink's main component was an acrylic resin, mixed with a small amount of pigment, and had its viscosity adjusted with organic solvent for example toluene. Then, an etchant liquid containing ferric chloride was used to etch the foil at 40° C. for approximately ten seconds to provide throughholes of a predetermined pattern penetrating the foil. Then, caustic soda was used to dissolve and dust remove the resist ink.

Figure 4:
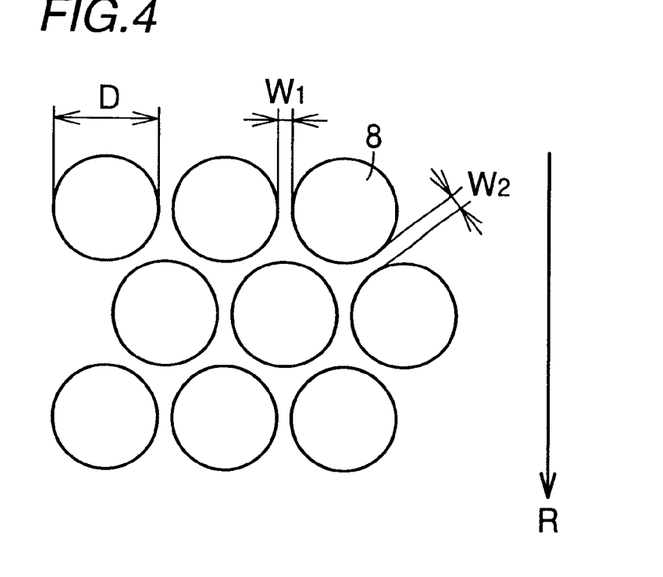
FIG. 4 shows a planar arrangement of throughholes provided in a sample E of a metal foil for a collector as a comparative example.
Figure 5:
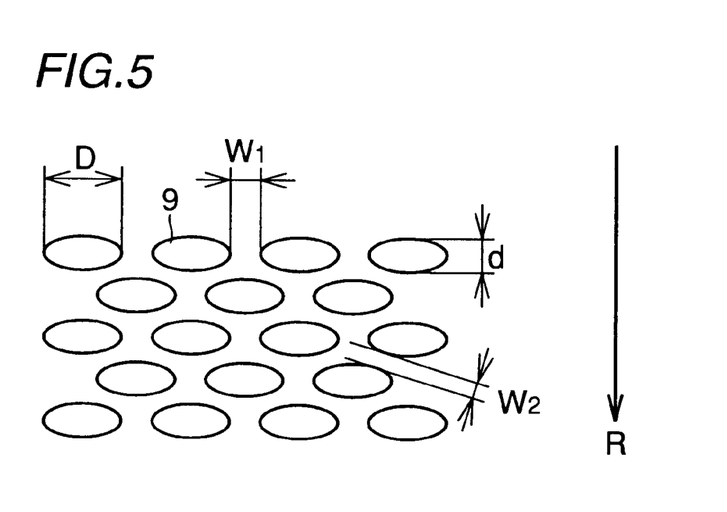
FIG. 5 shows a planar arrangement of throughholes provided in a sample F of a metal foil for a collector as a comparative example.

Furthermore, samples E and F were prepared of a metal foil for a collector having the throughholes patterned as shown in FIGS. 4 and 5, respectively, for comparison. Samples E and F were prepared by using a metal pattern to mechanically punch a JIS 1N30 hard aluminum foil of 40 $\mu$m in thickness as described above.

In the manners as described above, samples A to F were provided with throughholes patterned as described below.

Sample A

As shown in FIG. 1, throughholes 1 and 2 are arranged alternately in a direction in which the metal foil is rolled, i.e., a direction R. Throughhole 1 has two straight sides 11 and 12 that extend along lines intersecting with each other on their extensions to form an angle $\alpha$ of 60° to provide a corner 13, as indicated by the broken line in the figure, as a result of etching the foil. Throughhole 2 has two straight sides 21 and 22 that extend along lines intersecting with each other on their extensions to form an angle $\beta$ of 60° to provide a corner 23. Throughhole 1 has a largest diameter or dimension $D_1$ of 1.6 mm and throughhole 2 has a largest diameter or dimension $D_2$ of 2.1 mm. Furthermore, a continuous, elongate portion 3 having a width W of 0.22 mm is provided extending in the rolling direction R.

Sample B

As shown in FIG. 2, throughholes 4 are arranged in a direction in which the metal foil is rolled, i.e., a direction R. Throughhole 4 has two straight sides 41 and 42 that extend along lines intersecting with each other on their extensions to form an angle $\alpha$ of 60° to provide a corner 43. Throughhole 4 according to a resist film's designed pattern has a largest diameter or dimension D of 1.9 mm. Furthermore, a continuous, elongate portion 5 having a width W of 0.22 mm extends in direction R.

Sample C

As shown in FIG. 3, throughholes 6 are provided, arranged in a direction in which the metal foil is rolled, i.e., a direction R. Throughhole 6 has two straight sides 61 and 62 that extend along lines intersecting with each other on their extensions to form an angle $\alpha$ of 60° to provide a corner 63. Throughhole 6 according to a resist film's designed pattern has a largest diameter or dimension D of 1.9 mm. A continuous, elongate portion 7 having a width W of 0.22 mm extends in direction R.

Sample E

As a comparative example, as shown in FIG. 4, a round throughhole 8 is formed with a diameter D of 2.0 mm. In a direction perpendicular to direction R, multiple throughholes 8 are spaced $W_1$ by 0.2 mm. In a direction obliquely traversing direction R, throughholes 8 are spaced $W_2$ by 0.2 mm.

Sample F

As a comparative example, as shown in FIG. 5, an elliptic throughhole 9 is formed having a diameter D of 1.5 mm along its major axis and a diameter d of 0.5 mm along its minor axis. In a direction perpendicular to direction R, multiple throughholes 9 are spaced $W_1$ by 0.4 mm. In a direction obliquely traversing direction R, throughholes 9 are spaced $W_2$ by 0.2 mm.

The samples of a metal foil patterned with the throughholes formed as described above were measured for tensile strength. In measuring the samples for tensile strength, the samples, each having a width of 15 mm, were pulled at 20 mm/min, with an inter-chuck distance of 50 mm. Each sample had its tensile strength measured at three points in each of a direction in which the metal foil is rolled and a direction perpendicular to the direction in which the foil is rolled. The measurements at such three points were averaged for each of the two directions to obtain a tensile strength in each direction.

Each sample's metal foil had a hole area ratio calculated as measured in weight.

On a surface of the metal foil of each sample thus prepared, a positive-electrode active material formed of cobalt acid lithium of 50% by weight, acetylene black of 10% by weight, polyvinyl difloride (PVDF) of 5% by weight, and N methyl pyrrolidone (NMP) of 35% by weight is applied and thus processed to have a thickness of 80 $\mu$m after it is dried. Then a roll applying a rolling reduction of approximately 20% was used to press and thus allow an applied film of the positive-electrode active material to adhere to the surface of the metal foil to observe the adhesion of the applied film of the active material. The film's adhesion was estimated as represented below:

○: no peeling or crack observed;

Δ: partially cracking but no peeling observed; and

X: peeling observed.

A result obtained as measured as above is shown in Table 1.

TABLE 1

| Sample | Largest Diameter (Averaged) mm | Hole Area Ratio % | Tensile Strength N/15 mm | | Adhesion Test |
|---|---|---|---|---|---|
| | | | Direction of Rolling | Perpendicular Direction | |
| Inventive Examples | | | | | |
| A | 1.85 | 60.6 | 8.4 | 13.8 | ○ |
| B | 1.9 | 56.2 | 18.9 | 4.3 | ○ |
| C | 1.9 | 58.2 | 13.1 | 4.0 | ○ |
| Comparative Examples | | | | | |
| E | 2.0 | 50.0 | 5.1 | 4.8 | × |
| F | 1.5 | 60.2 | 2.2 | 16.3 | Δ |

As is apparent from table 1, the inventive examples, Samples A to C, each had its active material with a satisfactory adhesion, without peeling or cracking observed. Samples A to C were each also able to obtain a predetermined tensile strength in a direction in which the metal foil is rolled. In contrast, Samples E and F each had a poor adhesion, with its active material cracking and peeling. In addition to its active material's poor adhesion, Sample E had a reduced tensile strength in each of a direction in which the metal foil is rolled and a direction perpendicular to the direction in which the foil is rolled. It can thus be seen that for a round throughhole it is difficult to achieve a largest diameter and hole area ratio increased as in the inventive examples. Sample F also had a poor adhesion of its active material as well as a tensile strength extremely reduced in the direction in which the foil is rolled. It can thus be seen that an elliptical throughhole can only have a limited largest-diameter size and thus provide a limited hole area ratio.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A current collector for a secondary battery, comprising a metal foil, wherein:

said metal foil has a thickness of at least 5 μm and at most 200 μm;

said metal foil contains at least one of aluminum and copper;

said metal foil has therein a plurality of throughholes including first throughholes and second throughholes;

said plurality of throughholes has a total hole area corresponding to a hole area ratio of at least 40% relative to a total area of said metal foil;

each one of said first throughholes has a largest dimension of at least 1.55 mm and not more than 5.0 mm;

each one of said first throughholes has a first peripheral shape including at least four substantially straight sides;

at least respectively a first pair of said substantially straight sides adjoin each other to form a respective first acute corner of said first peripheral shape and respectively extend along two lines that intersect each other to form an acute angle spanning said first acute corner; and each one of said second throughholes has a second peripheral shape that is different from said first peripheral shape of said first throughholes.

2. The current collector for a secondary battery according to claim 1, wherein said first peripheral shape of each one of said first throughholes includes at least two of said first acute corners and at least two of said acute angles respectively spanning said first acute corners.

3. The current collector for a secondary battery according to claim 1, wherein at least respectively a second pair of said substantially straight sides of said first peripheral shape adjoin each other to form a respective second obtuse corner of said first peripheral shape and respectively extend along two lines that intersect each other to form an obtuse angle spanning said second obtuse corner.

4. The current collector for a secondary battery according to claim 1, wherein said first throughholes have said first peripheral shape and physical characteristics as result from having formed said first throughholes by etching said metal foil.

5. The current collector for a secondary battery according to claim 4, wherein said substantially straight sides are not perfectly straight and have a slight curvature as results from over-etching or under-etching said metal foil along a straight edge of an etching pattern mask.

6. The current collector for a secondary battery according to claim 4, wherein said first acute corner is not a sharp vertexed corner and has a rounded vertex as results from over-etching or under-etching said metal foil at a sharp vertexed corner of an etching pattern mask.

7. The current collector for a secondary battery according to claim 1, wherein said second throughholes have a largest dimension that is different from said largest dimension of said first throughholes.

8. The current collector for a secondary battery according to claim 7, wherein an average of said largest dimension of said first throughholes and said largest dimension of said second throughholes is at least 1.55 mm and not more than 5.0 mm.

9. The current collector for a secondary battery according to claim 1, wherein said thickness of said metal foil is in a range from 5 μm to 75 μm.

10. The current collector for a secondary battery according to claim 1, further comprising an electrochemical active material adhered onto said metal foil.

11. The current collector for a secondary battery according to claim 10, wherein said active material contains lithium.

12. A secondary battery including the current collector according to claim 10, wherein said secondary battery comprises a case, a positive electrode arranged in said case, and a negative electrode arranged in said case, and wherein said positive electrode or said negative electrode comprises said current collector.

13. The secondary battery according to claim 12, wherein said positive electrode comprises said current collector, and said metal foil of said current collector of said positive electrode contains aluminum.

14. The secondary battery according to claim 13, wherein said metal foil essentially consists of said aluminum.

15. The secondary battery according to claim 12, wherein said negative electrode comprises said current collector, and said metal foil of said current collector of said negative electrode contains copper.

16. The secondary battery according to claim 15, wherein said metal foil essentially consists of said copper.

17. The secondary battery according to claim 12, wherein said positive electrode comprises a first one of said current collectors with a first one of said metal foils having said throughholes therein, and said negative electrode comprises a second one of said current collectors with a second one of said metal foils having said throughholes therein.

18. The secondary battery according to claim 12, wherein said secondary battery is a lithium ion battery.

19. A method of manufacturing the current collector for a secondary battery according to claim 1, comprising the steps:

providing a metal foil;

forming on said metal foil a resist film having a pattern of openings;

etching away areas of said metal foil through said openings of said resist film, to thereby form at least said first throughholes in said metal foil; and removing said resist film from said metal foil.

20. The method according to claim 19, wherein said step of etching comprises applying an acid or alkaline solution to said areas of said metal foil through said openings of said resist film.

21. The current collector for a secondary battery according to claim 1, wherein said metal foil includes a continuous elongate portion that extends in an extension direction between neighboring ones of said throughholes, and that has a width of at least 0.1 mm and at most 2 mm perpendicularly to said extension direction between said neighboring ones of said throughholes.

22. The current collector for a secondary battery according to claim 21, wherein said metal foil has a tensile strength of at least 6N in said extension direction for a width of 15 mm of said metal foil.

23. A secondary battery including the current collector according to claim 21, wherein said current collector further comprises an electrochemical active material adhered onto said metal foil, wherein said secondary battery comprises a case, a positive electrode arranged in said case, and a negative electrode arranged in said case, and wherein said positive electrode or said negative electrode comprises said current collector.

24. The secondary battery according to claim 23, wherein said positive electrode comprises a first one of said current collectors with a first one of said metal foils having said throughholes therein, and said negative electrode comprises a second one of said current collectors with a second one of said metal foils having said throughholes therein.

25. The secondary battery according to claim 24, wherein said metal foil of said positive electrode contains said aluminum and said metal foil of said negative electrode contains said copper.

26. A current collector for a secondary battery, comprising a metal foil, wherein:

said metal foil has a thickness of at least 5 $\mu$m and at most 200 $\mu$m;

said metal foil contains at least one of aluminum and copper;

said metal foil has therein a plurality of throughholes including first throughholes;

said plurality of throughholes has a total hole area corresponding to a hole area ratio of at least 40% relative to a total area of said metal foil;

each one of said first throughholes has a largest dimension of at least 1.55 mm and not more than 5.0 mm; and each one of said first throughholes has a first peripheral shape including at least four substantially straight sides and at least three first acute corners respectively formed by at least three respective pairs of said substantially straight sides that adjoin each other and that respectively extend along two lines that intersect each other to form a respective acute angle respectively spanning a respective one of said first acute corners.

27. The current collector for a secondary battery according to claim 26, wherein at least another pair of said substantially straight sides of said first peripheral shape adjoin each other to form a respective second convex internal corner of said first peripheral shape and respectively extend along two lines that intersect each other to form a convex internal angle of more than 180° spanning said second convex internal corner.

28. The current collector for a secondary battery according to claim 26, wherein said metal foil includes a continuous elongate portion that extends in an extension direction between neighboring ones of said throughholes, and that has a width of at least 0.1 mm and at most 2 mm perpendicularly to said extension direction between said neighboring ones of said throughholes.

* * * * *

UNITED STATES PATENT AND TRADEMARK OFFICE
CERTIFICATE OF CORRECTION

PATENT NO.   : 6,447,957 B1
DATED        : September 10, 2002
INVENTOR(S)  : Sakamoto et al.

It is certified that error appears in the above-identified patent and that said Letters Patent is hereby corrected as shown below:

<u>Title page,</u>
Item [73], Assignee, replace "Toyo Aluminum Kabushiki Kaisha" by
-- Toyo Aluminium Kabushiki Kaisha --.

Signed and Sealed this

Twenty-fifth Day of February, 2003

JAMES E. ROGAN
*Director of the United States Patent and Trademark Office*